(12) United States Patent
Yoshida et al.

(10) Patent No.: US 6,713,914 B2
(45) Date of Patent: Mar. 30, 2004

(54) MOTOR ASSEMBLED BY USING MOTOR-BASE-HOLDER AND METHOD OF ASSEMBLING THE SAME MOTOR

(75) Inventors: Shigeru Yoshida, Tottori (JP); Kodo Fukuoka, Tottori (JP); Koji Kuyama, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 14 days.

(21) Appl. No.: 10/056,867

(22) Filed: Jan. 25, 2002

(65) Prior Publication Data

US 2002/0067087 A1 Jun. 6, 2002

Related U.S. Application Data

(62) Division of application No. 09/672,216, filed on Sep. 28, 2000.

(30) Foreign Application Priority Data

Dec. 10, 1999 (JP) ............................................ 11-351296

(51) Int. Cl.⁷ ................................................ H02K 5/00
(52) U.S. Cl. .............................. 310/89; 310/71; 310/81
(58) Field of Search ............................... 310/89, 71, 81, 310/67 R

(56) References Cited

U.S. PATENT DOCUMENTS

| | | | |
|---|---|---|---|
| 4,673,837 A | | 6/1987 | Gingerich et al. ........... 370/239 |
| 4,728,835 A | * | 3/1988 | Baines ......................... 310/71 |
| 4,847,528 A | * | 7/1989 | Eguchi et al. ............... 310/239 |
| 4,853,568 A | | 8/1989 | Fujiwara ................... 370/68 C |
| 5,256,922 A | * | 10/1993 | Tanaka et al. ................. 310/71 |
| 5,333,079 A | * | 7/1994 | Takegami et al. ......... 360/99.08 |
| 5,804,895 A | * | 9/1998 | Tsuzaki et al. ......... 310/40 MM |
| 6,274,955 B1 | * | 8/2001 | Satoh et al. .................... 310/71 |
| 6,365,995 B1 | * | 4/2002 | Fukuda et al. ................. 310/81 |
| 6,384,498 B1 | * | 5/2002 | Yamaguchi et al. ........... 310/81 |
| 6,452,298 B1 | * | 9/2002 | Fukuda et al. ................. 310/89 |

FOREIGN PATENT DOCUMENTS

| | | |
|---|---|---|
| JP | 06-038432 | 2/1994 |
| JP | 9-70162 | 11/1997 |
| JP | 10-108433 | 4/1998 |
| JP | 10-295068 | 4/1998 |
| JP | 10127031 | 5/1998 |

OTHER PUBLICATIONS

International Search Report dated Apr. 3, 2001 for PCT/JP00/06829.

International Search Report dated Jan. 26, 2001 for PCT/JP00/06829.

* cited by examiner

Primary Examiner—Dang Le
(74) Attorney, Agent, or Firm—RatnerPrestia

(57) ABSTRACT

A motor includes a motor-base-holder which comprises (a) a base, (b) a bearing supporter vertically protruded from the base for supporting a bearing, (c) a stator supporter concentric with the bearing supporter for being mounted with a stator, (d) a motor base having terminals made of a metal plate and insert-molded around the bearing supporter, and (e) a frame made of the same metal as the terminals and linked to fringe of the motor base. This structure solves difficulties of mini-motors such as difficulties of handling the motor, difficulties of mating those elements each other, and time-consuming bonding action. A method of assembling the same motor achieves high productivity.

3 Claims, 9 Drawing Sheets

MOTOR ASSEMBLED BY USING MOTOR-BASE-HOLDER AND METHOD OF ASSEMBLING THE SAME MOTOR

This application is a Divisional of U.S. patent application Ser. No. 09/672,216, filed Sept. 28, 2000.

TECHNICAL FIELD

The present invention relates to a construction of a mini-motor and a method of assembling the mini-motor at high productivity. More particularly, the present invention relates to a micro-motor producing vibration sensible to a human body. This micro-motor is employed in a cellular-phone to notify a user of a call with the vibration.

BACKGROUND ART

A motor used in information devices comprises the following elements:
- a metal base;
- a bearing, a printed circuit board, and a stator mounted to the metal base;
- a cylindrical rotor magnet mounted on an outer or inner wall of the stator core, thereby facing the magnet to the stator core.

When a motor has a certain size, this structure is easy to assemble; however, downsizing the motor increases difficulties of assembling and lowers the productivity, because assembling machines or operators' finger-tips cannot access to inside or even cannot access close to the motor.

The Japanese Patent Application Non-Examined Publication No. H10-127031 addresses the problem discussed above. FIG. 10 illustrates the motor of this prior art.

In FIG. 10, metal wired-board 14 is buried in base 24 made of synthetic resin with maintaining the insulation. A first end of board 14 extends over an upper end of base 24 as riser 40, and a second end is exposed as a connector terminal.

This structure allows terminal 42 of winding 18 coiled on stator core 20 to be coupled to riser 40 with ease.

However, downsizing the motor reveals a problem, i.e. elements of the motor are hard to handle by operators. For instance, a motor of 10 mm across gives us a difficulty to handle its components quickly. Further downsizing of the motor requires severer mating allowances between the components. This increases the difficulty of assembling the components into a motor. As such, the productivity is traded off for downsizing the motor. A breakthrough method of this problem has been enthusiastically demanded.

A section bonded with another section or a section undergone resin-welding needs time before it is fixed to. Shortening this waiting time has been also demanded.

SUMMARY OF THE INVENTION

The present invention addresses the problems discussed above, and aims to provide a motor having a structure allowing high productivity as well as a method of assembling the same motor by solving problems such as difficulty of handling, severity of mating, time-consuming of bonding or welding.

A motor-base-holder of the present invention comprises the following elements:
(a) a motor base including;
 (a-1) a base;
 (a-2) a bearing supporter protruded vertically from the base for supporting a bearing;
 (a-3) a stator supporter concentric with the bearing supporter for being mounted with a stator;
 (a-4) a terminal made of metal plate and insert-molded around the bearing supporter;
(b) a frame made of the same metal as the terminal and linked with fringe section of the motor base A motor of the present invention comprises the following elements:
(a) a motor base including;
 (a-1) a base;
 (a-2) a bearing supporter protruded vertically from the base for supporting a bearing;
 (a-3) a stator supporter concentric with the bearing supporter;
 (a-4) a terminal made of metal plate and insert-molded around the bearing supporter;

The motor base is formed by cutting off bridges linking between the motor base and the frame around the motor base.

(b) a stator mounted to the stator supporter; and
(c) a rotor supported by the bearing which is supported by the bearing supporter.

Another motor of the present invention comprises the following elements:
(a) a stator having a stator core;
(b) a motor base including:
 (b-1) a base;
 (b-2) a bearing supporter protruded vertically from the base for supporting a bearing;
 (b-3) a stator supporter concentric with the bearing supporter;
 (b-4) a stator fixer extending from the stator supporter; and
(c) a rotor supported by the bearing supported by the bearing supporter.

After the stator core is inserted into the stator supporter, a bushing is press-fitted into the stator fixer, thereby fixing the stator.

Still another motor of the present invention comprises the following elements:
(a) a motor base including:
 (a-1) a base;
 (a-2) a bearing supporter protruded vertically from the base for supporting a bearing;
 (a-3) a stator supporter;
 (a-4) a terminal made of metal plate and disposed around the bearing supporter;
 (a-5) a metal tip extended outside of the motor base;
(b) a stator mounted to the stator supporter;
(c) a rotor supported by the bearing which is supported by the bearing supporter; and
(d) a metal cover of which terminal is fixed to the metal tip, for covering the rotor.

The motor discussed above may be assembled through the following steps:
(a) positioning and supporting the motor base at a given place by the frame;
(b) assembling the stator and the rotor to the motor base; and
(c) detaching the motor base from the frame.

The present invention discussed above can solve the problems particularly in mini-motors such as difficulties in handling the parts of the motor, difficulties in mating the respective components, time-consuming of bonding or welding. As a result, a motor of high productivity and a method of assembling the motor can be obtained.

DETAILED DESCRIPTION OF THE PREFERRED EMBODIMENTS

Exemplary embodiments of the present invention are demonstrated hereinafter with reference to the attached drawings.

Exemplary Embodiment 1

Figure 1:
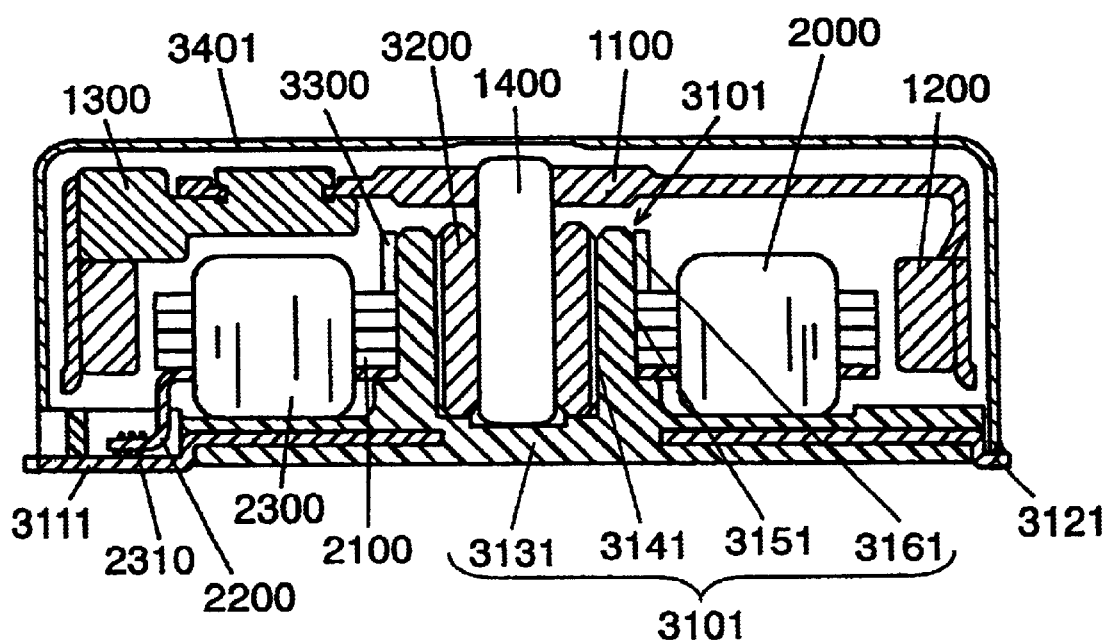
FIG. 1 is a cross section illustrating a structure of a motor in accordance with a first exemplary embodiment of the present invention.
Figure 2A:
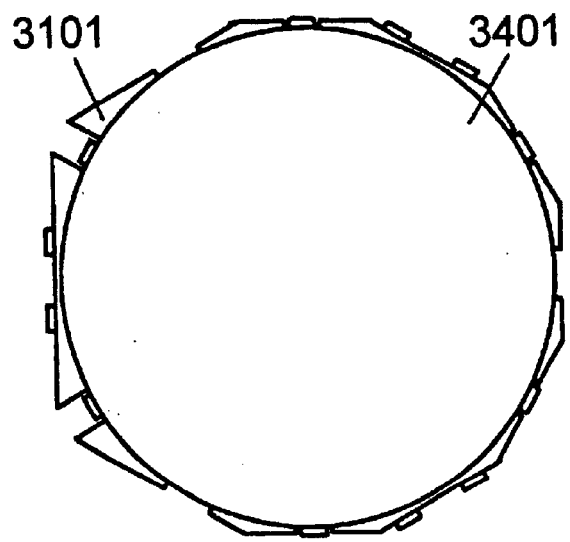
FIG. 2A is a top view of the same motor as shown in FIG. 1.
Figure 2B:
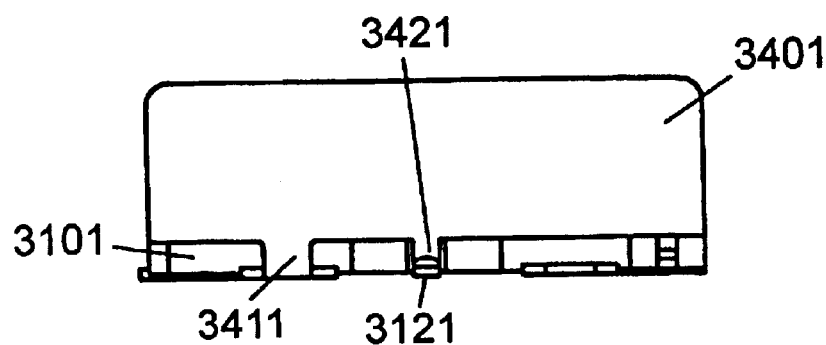
FIG. 2B is a side view of the same motor as shown in FIG. 1.
Figure 2C:
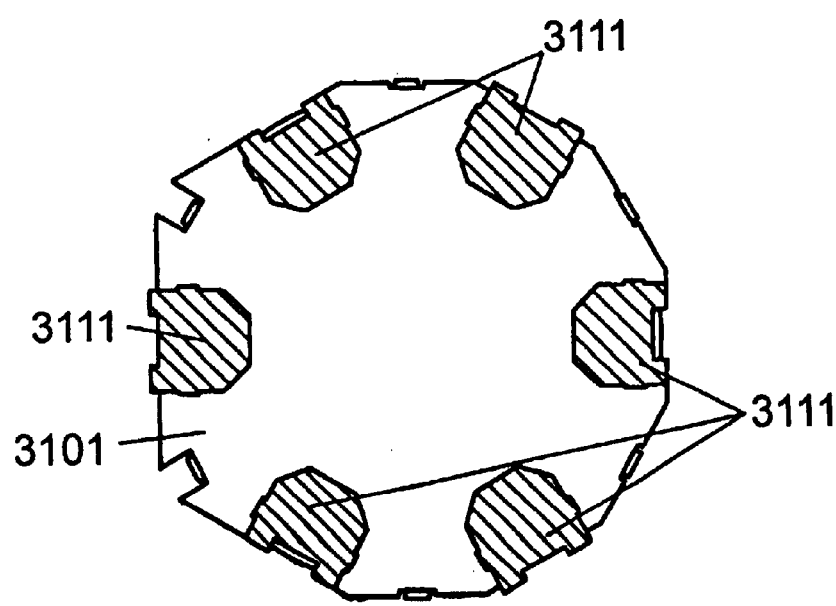
FIG. 2C is a bottom view of the same motor as shown in FIG. 1.
Figure 3A:
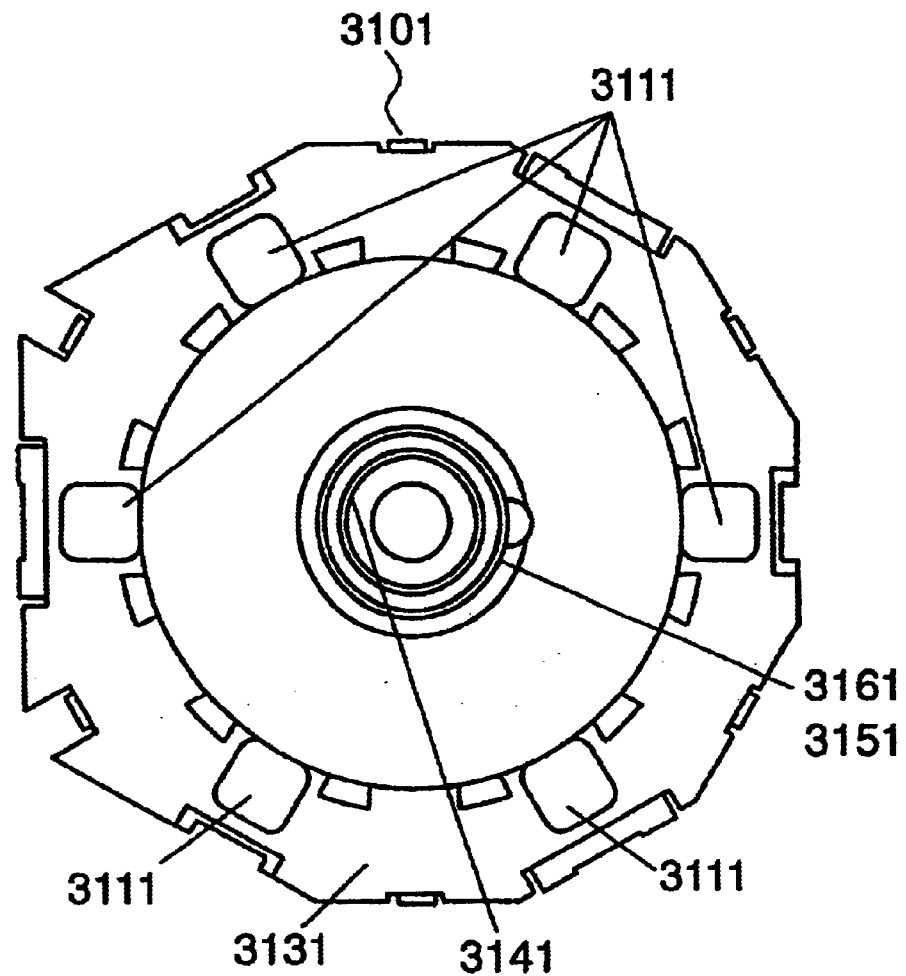
FIG. 3A is a plan view of a motor base of the motor shown in FIG. 1.
Figure 3B:
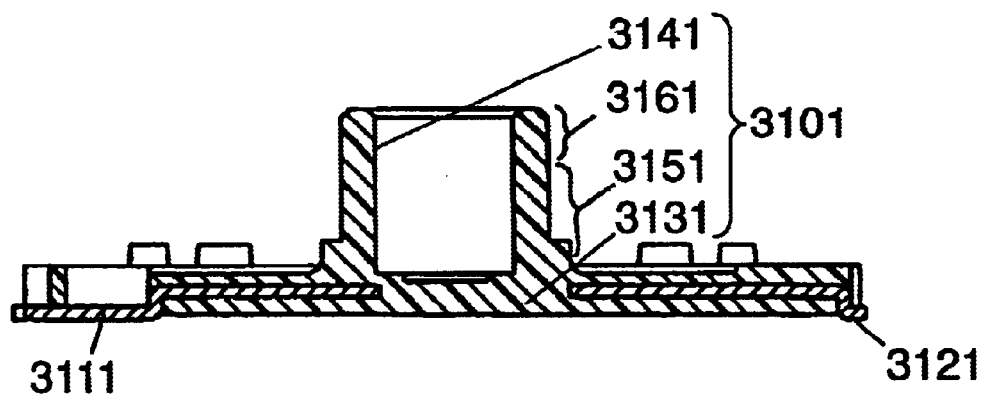
FIG. 3B is a side view of the motor base of the motor shown in FIG. 1.
Figure 4:
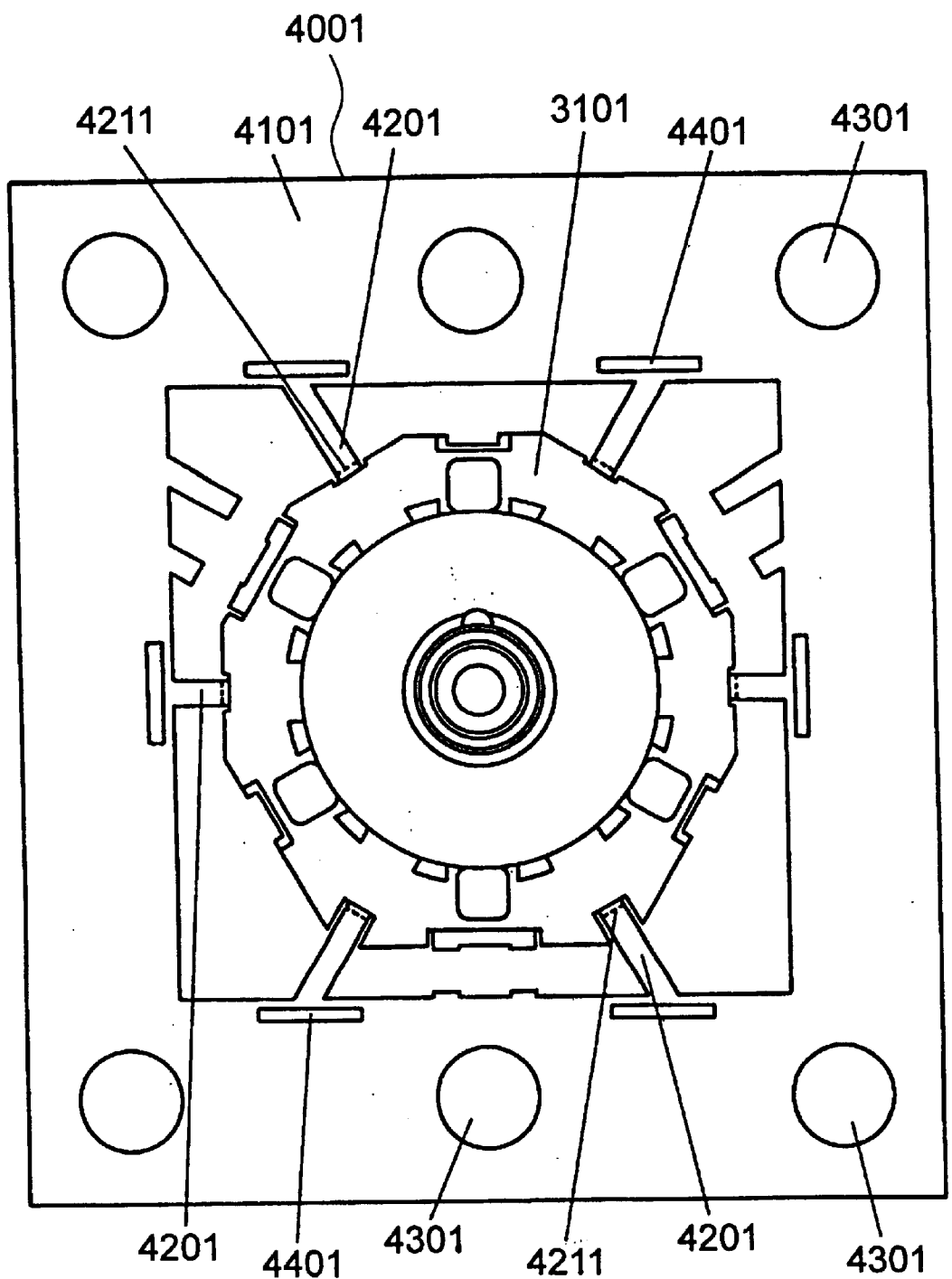
FIG. 4 is a plan view of a motor-base-holder.
Figure 5:
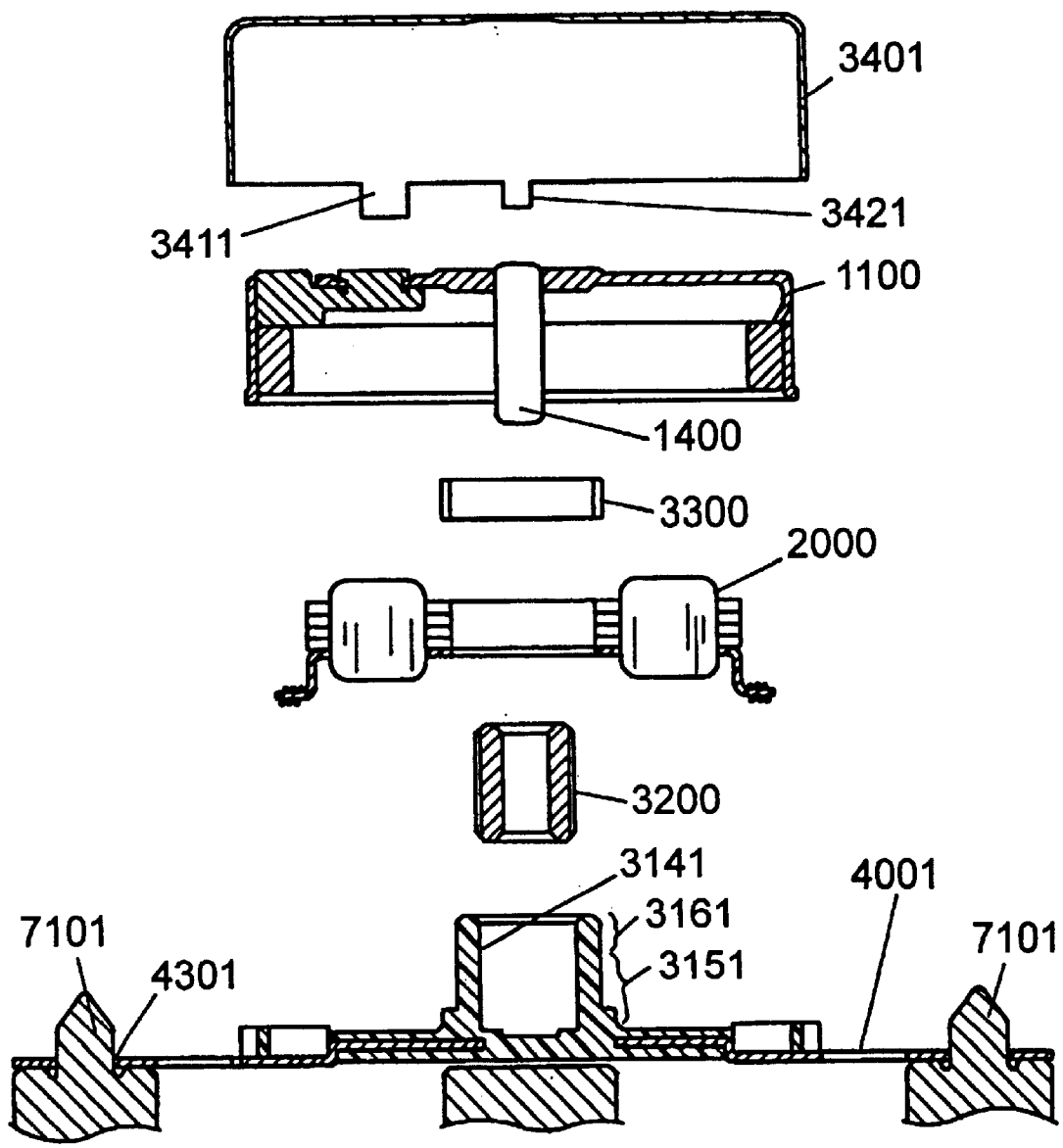
FIG. 5 is an exploded lateral view of the motor shown in FIG. 1.

FIG. 1 is a cross section illustrating a structure of a motor in accordance with the first exemplary embodiment of the present invention. FIG. 2A is a top view, FIG. 2B is a side view and FIG. 2C is a bottom view of the same motor. FIG. 3A is a plan view of a motor base of the motor shown in FIG. 1. FIG. 3B is a side view of the same motor base. FIG. 4 is a plan view of a motor-base-holder. FIG. 5 is an exploded lateral view of the motor shown in FIG. 1.

In FIG. 1, the motor comprises a stator, a rotor and a cover. The rotor includes rotor frame 1100 and ring-shaped magnet 1200 mounted to an inner wall of rotor frame 1100, and revolves on shaft 1400 mounted at the center thereof. Further, eccentric weight 1300 is mounted to frame 1100, thereby producing vibration when the motor spins.

Stator 2000 is mounted to motor base 3101, and a bearing, i.e. metal 3200, is mounted to the center of base 3101. Stator 2000 includes stator core 2100, wire terminating member 2200, and winding 2300. Terminal 3111 of base 3101 is coupled to winding's terminal 2310. Shaft 1400 is jounaled by metal 3200, and cover 3401 covers the rotor.

An appearance of the motor used in this first embodiment shows, as illustrated in FIG. 2A, circular cover 3401 on polygonal motor-base 3101. As shown in FIG. 2B, cover 3401 has some protrusions 3411 and 3421 extended to base 3101. Some of the protrusions extend to as deep as a lower end of base 3101, and the other are coupled with metal tip 3121 extended from a side face of base 3101. On the bottom face of base 3101, six terminals 3111 are exposed as shown in FIG. 2C. These exposed terminals can be coupled with a base board (not shown) of a device, e.g. a cellular phone, on which the motor is mounted by re-flow soldering. This coupling allows terminals 3111 to carry electric current from the device board to the stator windings, thereby spinning the rotor. Then weight 1300 produces vibrations to make the device vibrate, and this notifies a device user of a calling.

The motor-base of motor by the present invention is detailed hereinafter.

As shown in FIG. 3B, motor-base 3101 is made of resin molded, and comprises approx. flat base 3131, bearing supporter 3141 protruding vertically from the center of base 3131 for supporting the bearing, and stator supporter 3151 concentric with the bearing supporter and for being mounted with the stator. On base 3131, as shown in FIG. 3A, six terminals 3111 are disposed around bearing supporter 3141. These terminals 3111 are made of metal plate and insert-molded into base 3131. The upper face of terminals 3111 are coupled with the windings' terminals of the stator, and the lower face thereof are coupled with the device board by re-flow soldering.

The motor-base detailed above is a part of a completed motor; however, the present invention preferably handles the motor-base including a metal frame outside thereof when the motor is assembled, to be more specific, motor-base 3101 with metal frame 4101 added to outside of base 3101 forms motor-base-holder 4001 as shown in FIG. 4.

Now, motor-base-holder 4001 is detailed.

Metal frame 4101 shapes in a rectangle with fallen-out section in the center like a picture frame. Motor base 3101 is disposed at the center of holder 4001. Frame 4101 has six bridges 4201 which are arranged in radial at approx. the same intervals around base 3101. As such, frame 4101 surrounds and holds base 3101. Base 3101 is separated off from frame 4101 at perforations 4211 indicated with broken lines. Six round-holes 4301 are punched through frame 4101 for positioning holder 4001.

A process of assembling the motor using holder 4001 is demonstrated with reference to FIG. 5.

First, place holder 4001 on an assembling machine by fitting round-holes 4301 to positioning pins 7101.

Second, mate metal 3200, i.e. the bearing, in bearing supporter 3141 of the motor-base.

Third, insert stator 2000 into stator supporter 3151.

Then press-fit bushing 3300 into stator fixer 3161. In this embodiment, the outer diameter of stator supporter 3151 is the same as that of stator fixer 3161. Bushing 3300 and stator fixer 3161 are manufactured to be tightly mated each other. Stator 2000 can be thus fixed to stator supporter just by press-fitting bushing 3300 into stator fixer 3161.

After that, weld the windings' terminals of stator to the terminal of motor-base. A resistance-welding-machine may be used in this case.

On the other hand, the rotor has been assembled as shown in FIG. 5, and is supplied to the assembled body of motor-base-holder 4001 with stator 2000. A motor assembling machine chucks rotor frame 1100, and inserts shaft 1400 by centering metal 3200.

Then cap the rotor with cup-shaped cover 3401. At this time, protrusions 3411 and 3421 extended from the end of cover 3401 are positioned with corresponding places on the motor-base.

Protrusions 3421 is fixed to metal tip 3121 protruded from the motor-base by welding as shown in FIG. 2B. A laser-welding-machine may be used in this case.

Finally, base 3101 is cut off from frame 4101 at perforations 4211 shown in FIG. 4.

The motor thus assembled is shipped to the market after inspection and packaging. Meanwhile, a performance inspection is carried out as follows: the electrical conductance between terminals and bridges of the motor base is cut off, or the bridge is kept as a common grounding terminal, then the motor being kept on the metal frame can be inspected.

The motor in accordance with the first embodiment uses motor-base-holder 4001 linked with metal frame 4101 made of the same material as terminal 3111, and holder 4001 is disposed outside of motor base 3101. Frame 4101 made by punching a piece of metal plate together with terminals 3111 positions base 3101 with respect to the assembling machine. The insert-mold into base 3101 is carried out with respect to round holes 4301 of frame 4101, base 3101 can be thus positioned much more precisely than a conventional method which sets positioning reference on a resin-made motor-base. The method of the present invention thus can deal with a micro motor which requires a precise mating allowance, and can realize to assemble the micro motor at high productivity.

In the motor of this first embodiment, base 3101 is positioned together with base-holder 4001 and supported by bridges 4201. Bearing supporter 3141 protrudes vertically from the base center, and metal 3200 is mounted to bearing supporter 3141, therefore, metal 3200 also protrudes from base 3101 with a certain distance. Bridges 4201 supporting base 3101 is elastically deformed by lateral force. When shaft 1400 is inserted into metal 3200, this structure produces centering action between them. This centering action contributes to high productivity of assembling the micro motor.

The motor in accordance with this first embodiment is a micro-flat-motor of 10 mm across. The shaft of the motor is 0.8 mm across and a clearance between the shaft and the metal (bearing) is max. several $\mu$m. This precision is not only required by these elements but also by other elements. Automatic machines assemble those elements into a micro-motor at a high speed. Such an ultra-micro motor owes the high-speed assembly to the assembling method of the present invention, which allows quick handling of elements, highly precise positioning, and automatic centering action.

In the first embodiment, trim 4401 is disposed between bridge 4201 and picture-frame type frame 4101. This trim 4401 functions as follows: Terminals 3111 made of metal plate are disposed on the bottom face of the motor so that the device board can be soldered with the motor by re-flow soldering. However, the metal plate should be insulated and yet held, thus the metal plate must be insert-molded in the resin of base 3101. Therefore, the metal plate is inevitably shaped in a step-like form. In this case, trim 4401 allows less stress to remain in the metal plate, thus sections around the terminals and the metal frame are free from being abnormally deformed.

In the first embodiment, a plurality of perforations 4211 are disposed around base 3101, and frame 4101 is separated from base 3101 at perforations 4211 which are, more particularly, arranged at the same intervals around base 3101. This structure prevents base 3101 from being supported unbalancedly, therefore, when a vertical external forces is applied, it directs the displacement in vertical direction. This does not lower the positioning precision for assembly. When a radial external force is applied to metal 3200, it causes uniform elastic deformation in all directions. This does not adversely affect the centering action. As a result, an ultra-micro-motor can be assembled with high productivity.

A plurality of perforations are arranged on both sides of a center line of base 3101 so that the effect discussed above can be obtained with ease. As will be discussed in a third embodiment, perforations cannot be arranged uniformly in all directions for some reason; and yet, the perforations are preferably arranged around the motor-base to be symmetric with respect to a point.

As FIG. 1 and FIG. 5 illustrate, stator core 2100 is inserted into stator supporter 3151, then bushing 3300 is press-fitted into stator fixer 3161, thereby fixing stator 2000 to stator supporter 3151. Since only press-fitting of bushing 3300 can fix stator 2000, the waiting-time after bonding or welding the stator can be saved. As a result, total assembly time can be shortened.

Protrusions 3421 extended from fringe of cover 3401 are fixed to metal tips 3121 extended from base 3101. This structure, i.e. connection between metals, yields a strong bonding force per unit area. Thus the bonding can be completed with a small area, and this is preferable for an ultra-micro-motor. The structure discussed above also allows the fringe of cover 3401 to be electrically coupled with metal tips 3121. Accordingly, while metal tip 3121 is electrically coupled to terminal 3111, metal tip 3121 is grounded to the device, thereby shielding electromagnetic noises produced by the motor.

In the first embodiment, protrusions 3421 are welded to tips 3121, so that coagulating time of the welding is shorter than that for resin. As a result, the total assembly time of the motor can be shortened. A protruded amount to outside the motor is less than that by engaging-deformation-fixing method which is discussed in a fifth embodiment. Thus the first embodiment is more advantageously for downsizing the motor over the fifth embodiment.

Exemplary Embodiment 2

Figure 6:
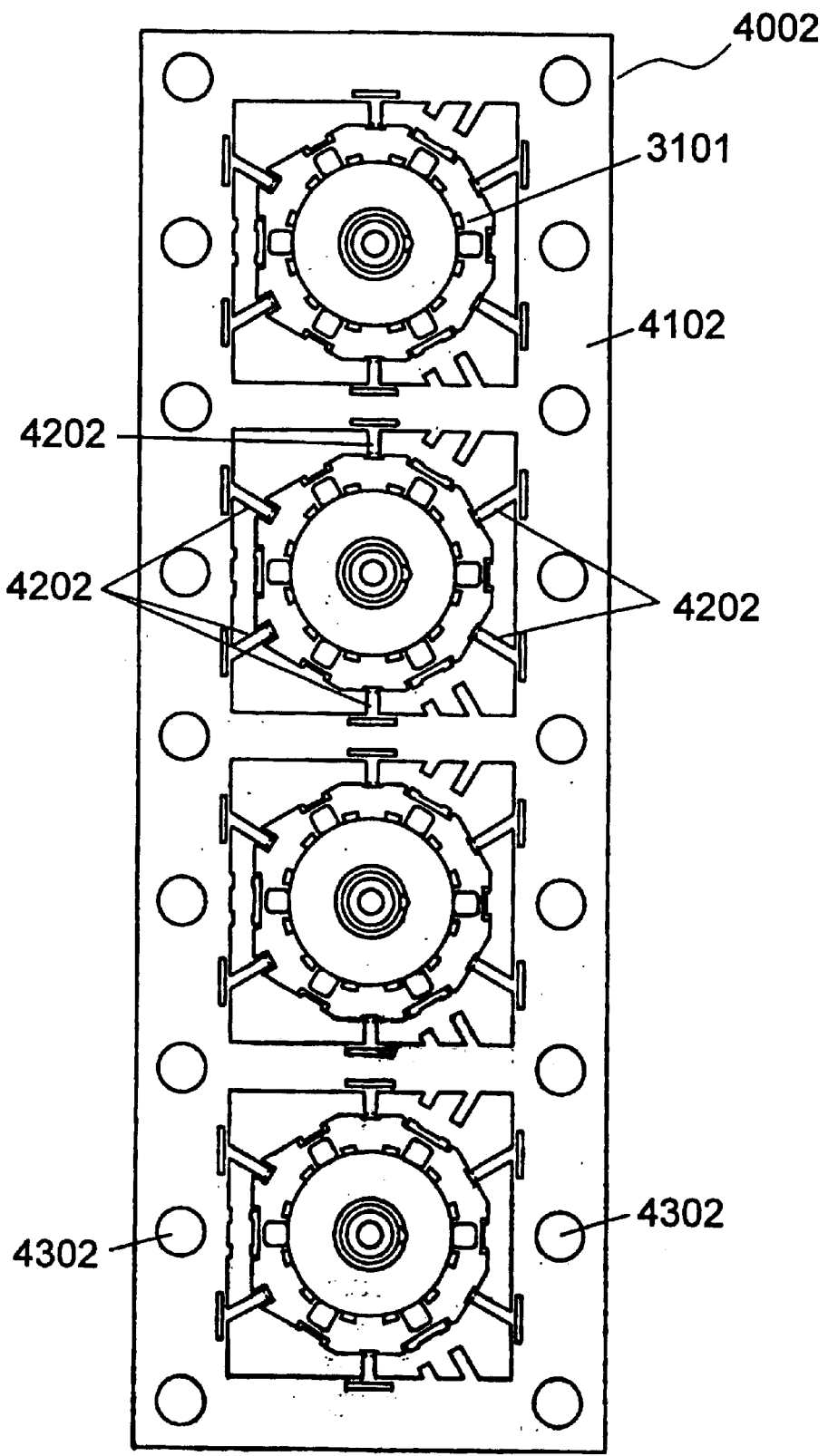
FIG. 6 illustrates a motor-base-holder in accordance with a second exemplary embodiment of the present invention.

FIG. 6 illustrates a motor-base-holder in accordance with the second exemplary embodiment of the present invention.

In FIG. 6, rectangular metal frame 4102 of motor-base-holder 4002 is formed by linking the metal frames shown in FIG. 4 and used in the first embodiment. Metal frame 4102 includes four pieces of motor-bases 3101. Six bridges 4202 are provided to each base 3101 and they are arranged in radial at approx. the same intervals. Round holes 4302 for positioning are provided in total 18 on frame 4102.

In the second embodiment, a plurality of motor-bases are linked to form a rectangle. Since this holder holds a plurality of motor-bases, better handling can be expected than holding a single base, and ultra-micro-motors can be handled with much ease. A positioning time at each step as well as an assembling time decreases at greater numbers of motor-base held by the holder. In this second embodiment, a rectangle containing several motor-bases or maximum not more than 20 motor-bases is handled, i.e. as far as the rectangle keeps a plate and not shapes in a hoop, so that bending stress is not applied to this size of rectangle in storage. As a result, the motor-bases are not deformed by creep. This is different from a third embodiment discussed later because the third embodiment addresses a belt-like holder.

Exemplary Embodiment 3

Figure 7:
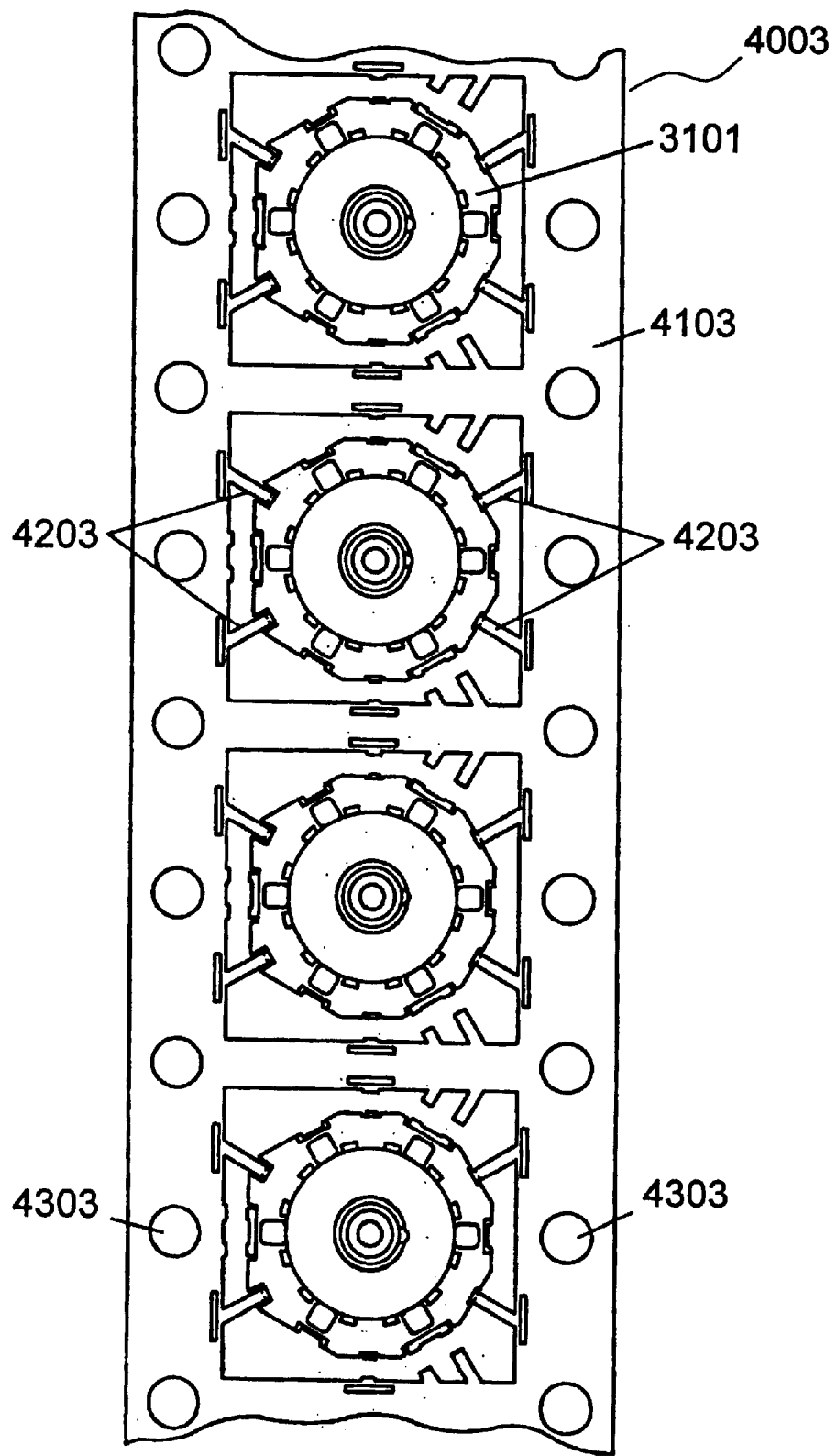
FIG. 7 illustrates a motor-base-holder in accordance with a third exemplary embodiment of the present invention.

FIG. 7 illustrates a motor-base-holder in accordance with the third exemplary embodiment of the present invention.

Metal frame 4103 of motor-base-holder 4003 extends long and forms a belt. Frame 4103 contains numbers of motor-bases 3101. Four bridges 4203 (two bridges per side) are provided to each base 3101, this is different from that of the second embodiment. Bases 3101 are linked to frame 4103 by bridges 4203 at both the sides of the frame in width direction of the belt. Round holes 4303 for positioning are sequentially provided on frame 4103.

In the third embodiment, as discussed above, fringes of plurality of motor-bases are linked by the metal frame, thereby forming a belt. This structure allows the motor-base to be transferred with the metal frame in sequence, so that the motors can be continuously assembled. This structure thus can simplify a transferring mechanism, and allows assembly equipment to be compact and inexpensive. As a result, an inexpensive motor can be manufactured at high productivity.

Adjacent motor-bases in the holder of this third embodiment are separated in the longitudinal direction of the belt. When the belt-like holder is wound on a reel, the motor-base which is insert molded is free from bending stress. Thus creep is prevented to occur on the resin in storage of the motor-bases, resin-mold products are not degraded their precision in shape.

A number of bridges is preferably not more than three on one side. If more than two bridges are provided on one side, bending stress tends to occur in the motor-base when the metal frame warps.

Exemplary Embodiment 4

Figure 8:
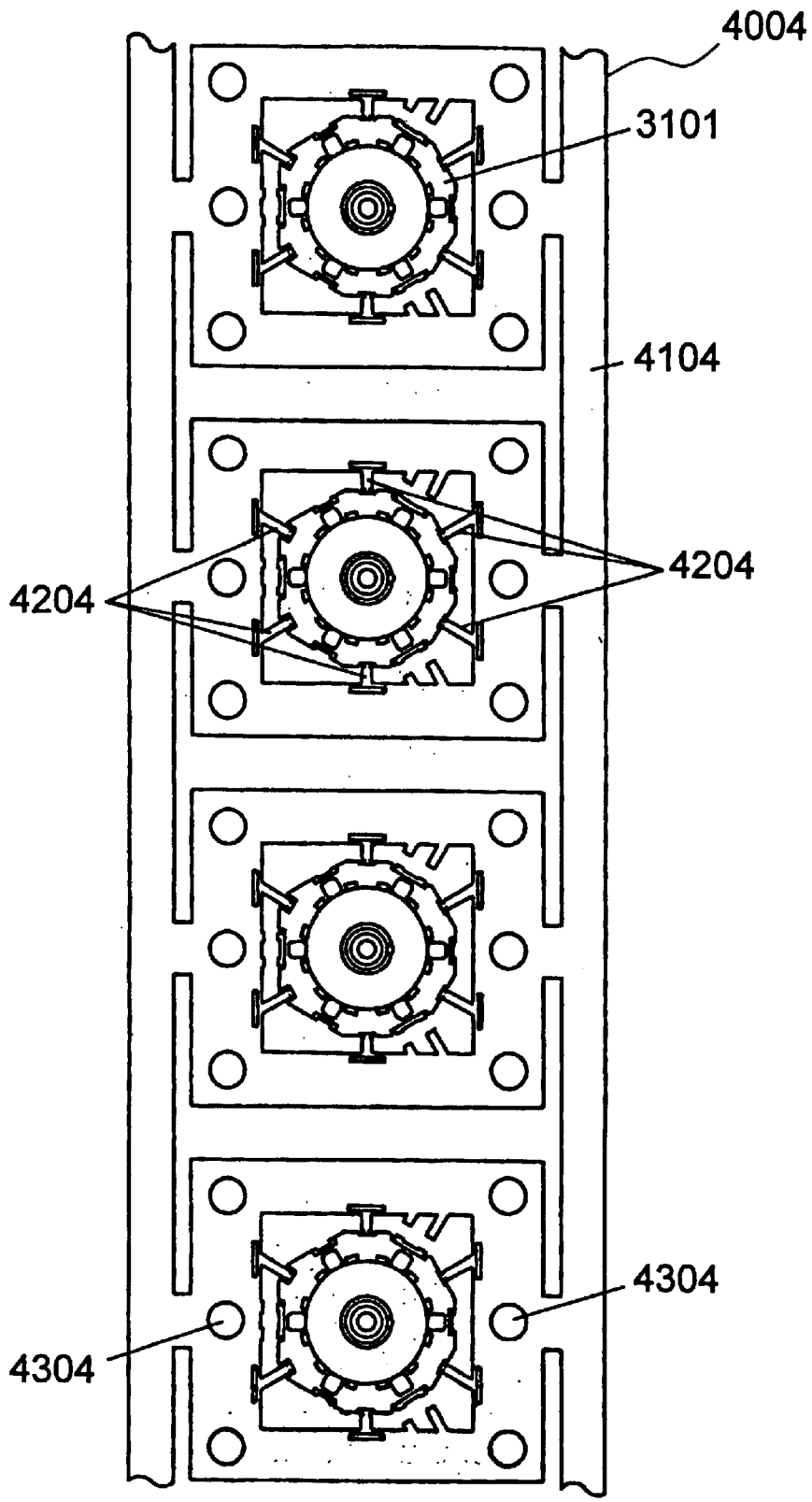
FIG. 8 illustrates a motor-base-holder in accordance with a fourth exemplary embodiment of the present invention.

FIG. 8 illustrates a motor-base-holder in accordance with the fourth exemplary embodiment of the present invention.

Metal frames 4104 of motor-base-holders 4004 are linked with each other to form a belt. However, the metal frame used in the first embodiment is not just linked in the longitudinal direction, but the metal frame is linked with the sections forming both sides of the belt (these sections may be part of metal frame 4104). Six bridges 4204 are provided to each base 3101 as same as the first embodiment and support the base evenly.

The motor-bases held by this holder are separated in the longitudinal direction. The resin-made motor bases are thus prevented from creep in storage, and resin-mold products are not degraded precision in shape. Further, each motor base is supported its surrounding evenly, so that the uniform centering action in all directions is obtainable.

Exemplary Embodiment 5

Figure 9:
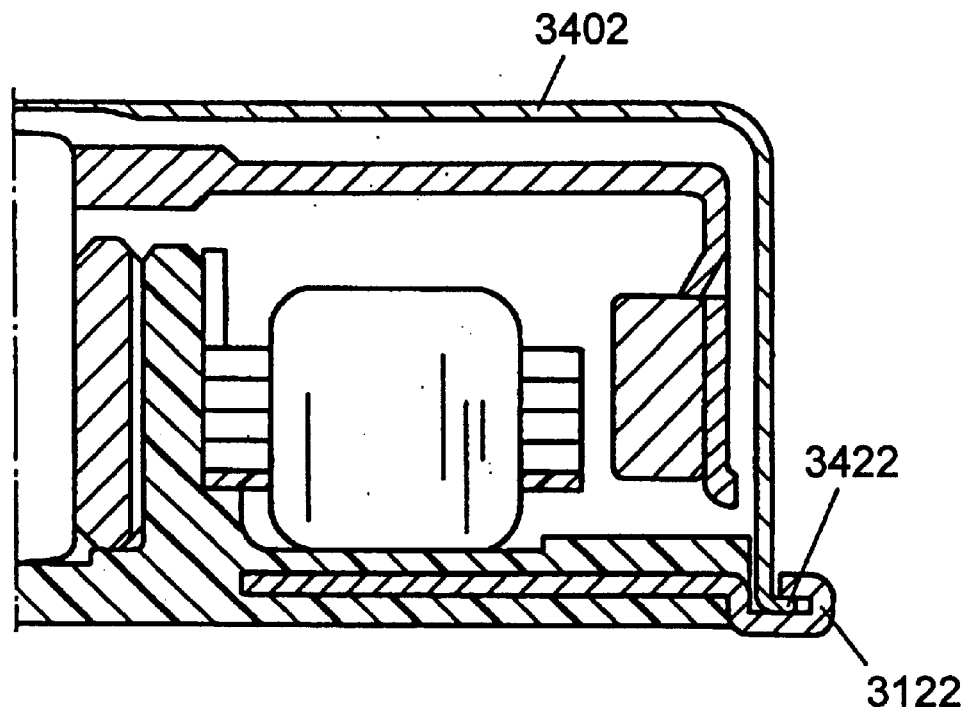
FIG. 9 is a partial lateral view illustrating how a motor cover is fixed to the motor base in accordance with a fifth exemplary embodiment of the present invention.
Figure 10:
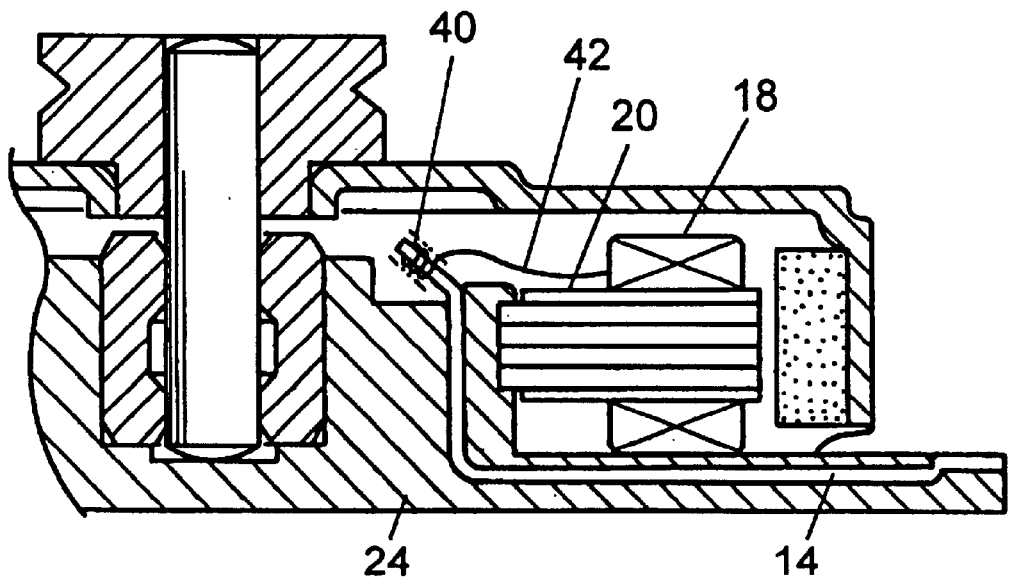
FIG. 10 is a cross section illustrating a structure of a conventional motor.

FIG. 9 is a partial lateral view illustrating how a motor cover is fixed to the motor base in accordance with the fifth exemplary embodiment of the present invention.

In FIG. 9, protrusions 3422 extended from end of cover 3402 extends their tips outwardly in radial direction. Metal tips 3122 extended from a motor base are folded so that the tips can clip protrusions 3422.

In this fifth embodiment, the end of cover and the metal tips of motor base are engaged and deformed to fix each other. Metal is easy to deform flexibly and it maintains the strength after deformation. Therefore, the metal can be bonded with a small area, and this is preferably to an ultra-micro-motor. The fixation by this engaging-deformation needs not the time before solidification, while heat-resin-bonding requires some time for solidification. As a result, assembly time of the motor can be shortened.

Several exemplary embodiments of the present invention have been demonstrated; however, the present invention is not limited to these embodiments but various applications are available within the scope of the invention. The present invention is good for ultra-micro-motors as discussed in the embodiments; however, it is also applicable to various kinds of motors. Round holes for positioning are disposed on the metal frame on both sides; however, the round holes may be disposed on one side.

As discussed above, the present invention solves the difficulty of handling motors, difficulty of mating elements of the motors, time-consuming bonding, and provides a motor allowing high productivity as well as a method of assembling the same motor.

Industrial Applicability

The present invention provides a structure best-suited to a mini motor and a method of assembling the same motor at high productivity. A motor of the present invention comprises: a motor-base-holder including (a) a base, (b) a bearing supporter vertically protruding from the base for supporting a bearing, (c) a stator supporter concentric with the bearing supporter for being mounted with a stator, (d) a motor base made of metal plate and having a terminal insert molded around the bearing supporter, and (e) a frame made of the same metal as the terminal and linked to fringe of the motor base. The present invention also provides a method of assembling the same motor. The present invention is best-suited to an ultra-micro-motor for producing vibration to notify a user of a calling. Such a motor is employed in, e.g. cellular phone.

What is claimed is:

1. A motor comprising:
   (a) a motor base including:
      (a-1) a base;
      (a-2) a bearing supporter protruded vertically from said base for supporting a bearing;
      (a-3) a stator supporter;
      (a-4) a plurality of terminals made of metal plate and disposed around said bearing supporter;
      (a-5) a metal tip extended outside of said motor base;
   (b) a stator mounted to said stator supporter;
   (c) a rotor supported by the bearing which is supported by said bearing supporter; and
   (d) a metal cover, of which end is fixed to said tip, for covering said rotor,
   wherein the base has a substantially flat side extending from at least one of said plurality of terminals to the metal tip.

2. The motor as defined in claim 1, wherein the end of said metal cover is fixed to said metal tip by welding.

3. The motor as defined in claim 1, wherein the end of said metal cover is fixed to said metal tip by engaging and deforming thereof.

* * * * *

UNITED STATES PATENT AND TRADEMARK OFFICE
CERTIFICATE OF CORRECTION

PATENT NO. : 6,713,914 B2
DATED : March 30, 2004
INVENTOR(S) : Shigeru Yoshida et al.

It is certified that error appears in the above-identified patent and that said Letters Patent is hereby corrected as shown below:

<u>Title page,</u>
Item [57], ABSTRACT,
Line 1, "which comprises" should read -- having --.

<u>Column 8,</u>
Line 42, between "said' and "tip", insert -- metal --.

Signed and Sealed this

Nineteenth Day of April, 2005

JON W. DUDAS
*Director of the United States Patent and Trademark Office*